United States Patent
Zhang et al.

(10) Patent No.: US 8,005,358 B2
(45) Date of Patent: Aug. 23, 2011

(54) SYSTEM AND METHOD FOR SUPPRESSING BEAT NOISE IN LINE MONITORING EQUIPMENT

(75) Inventors: Hongbin Zhang, Marlboro, NJ (US); Ralph Brian Jander, Freehold, NJ (US); Ram M. Engira, Neptune, NJ (US)

(73) Assignee: Tyco Electronics Subsea Communications LLC, Morristown, NJ (US)

( * ) Notice: Subject to any disclaimer, the term of this patent is extended or adjusted under 35 U.S.C. 154(b) by 764 days.

(21) Appl. No.: 11/782,348

(22) Filed: Jul. 24, 2007

(65) Prior Publication Data

US 2009/0028549 A1    Jan. 29, 2009

(51) Int. Cl.
*H04B 10/08*    (2006.01)

(52) U.S. Cl. ........... 398/16; 398/90; 398/177; 398/194; 398/196

(58) Field of Classification Search .............. 398/16, 398/175–177, 90, 95, 194, 196, 37, 30, 31; 359/110, 177, 176, 175, 179, 163, 341
See application file for complete search history.

(56) References Cited

U.S. PATENT DOCUMENTS

| | | | | |
|---|---|---|---|---|
| 5,477,368 A * | 12/1995 | Eskildsen et al. | ............. | 398/147 |
| 5,793,909 A | 8/1998 | Leone et al. | | |
| 5,812,296 A * | 9/1998 | Tarusawa et al. | ............. | 398/116 |
| 5,969,833 A * | 10/1999 | Jensen | ............. | 398/34 |
| 6,134,037 A * | 10/2000 | Shabeer et al. | ............. | 398/157 |
| 6,414,775 B1 * | 7/2002 | Pedersen | ............. | 398/177 |
| 6,417,942 B1 * | 7/2002 | Seto et al. | ............. | 398/5 |
| 6,708,004 B1 * | 3/2004 | Homsey | ............. | 398/177 |
| 6,831,774 B2 * | 12/2004 | Fujiwara et al. | ............. | 359/326 |
| 6,842,585 B2 * | 1/2005 | Matsuo et al. | ............. | 396/89 |
| 7,388,657 B2 * | 6/2008 | Abbott | ............. | 356/73.1 |
| 7,809,279 B2 * | 10/2010 | Zhang et al. | ............. | 398/177 |
| 7,872,737 B2 * | 1/2011 | Zhang et al. | ............. | 356/73.1 |
| 2002/0135840 A1 | 9/2002 | Spagnoletti et al. | | |
| 2004/0047295 A1 * | 3/2004 | Morreale | ............. | 370/241 |
| 2005/0041902 A1 | 2/2005 | Frigo et al. | | |

OTHER PUBLICATIONS

International Search Report and Written Opinion dated Oct. 14, 2008 issued in related International Patent Application No. PCT/US08/70990.

* cited by examiner

*Primary Examiner* — Ken N Vanderpuye
*Assistant Examiner* — Hibret A Woldekidan
(74) *Attorney, Agent, or Firm* — Grossman, Tucker, Perreault & Pfleger, PLLC

(57) ABSTRACT

A system and method for suppressing beat noise in line monitoring equipment. A wavelength dither generator wavelength modulates a carrier wavelength of a test signal laser transmitter. A test code is modulated on the dithered carrier wavelength to provide a test signal output of the line monitoring equipment.

20 Claims, 3 Drawing Sheets

SYSTEM AND METHOD FOR SUPPRESSING BEAT NOISE IN LINE MONITORING EQUIPMENT

TECHNICAL FIELD

The present application relates to communication systems and, more particularly, to a system and method for reducing beat noise in transmission line monitoring equipment.

BACKGROUND

In long distance fiber optic communication systems it may be important to monitor the health of the system. For example, monitoring can be used to detect faults or breaks in the fiber optic cable, faulty repeaters or amplifiers or other problems with the system.

Known monitoring techniques include use of line monitoring equipment that generates a test signal representing a pseudo random bit sequence. The line monitoring equipment may transmit the test signal with the information signals, e.g. in wavelength division multiplexed system. The test signal may be returned to the line monitoring equipment through a high-loss loopback path within an amplifier or repeater. The line monitoring equipment may then separate the returned test signal from the data signals, and process the test signal to examine the health of the transmission system.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
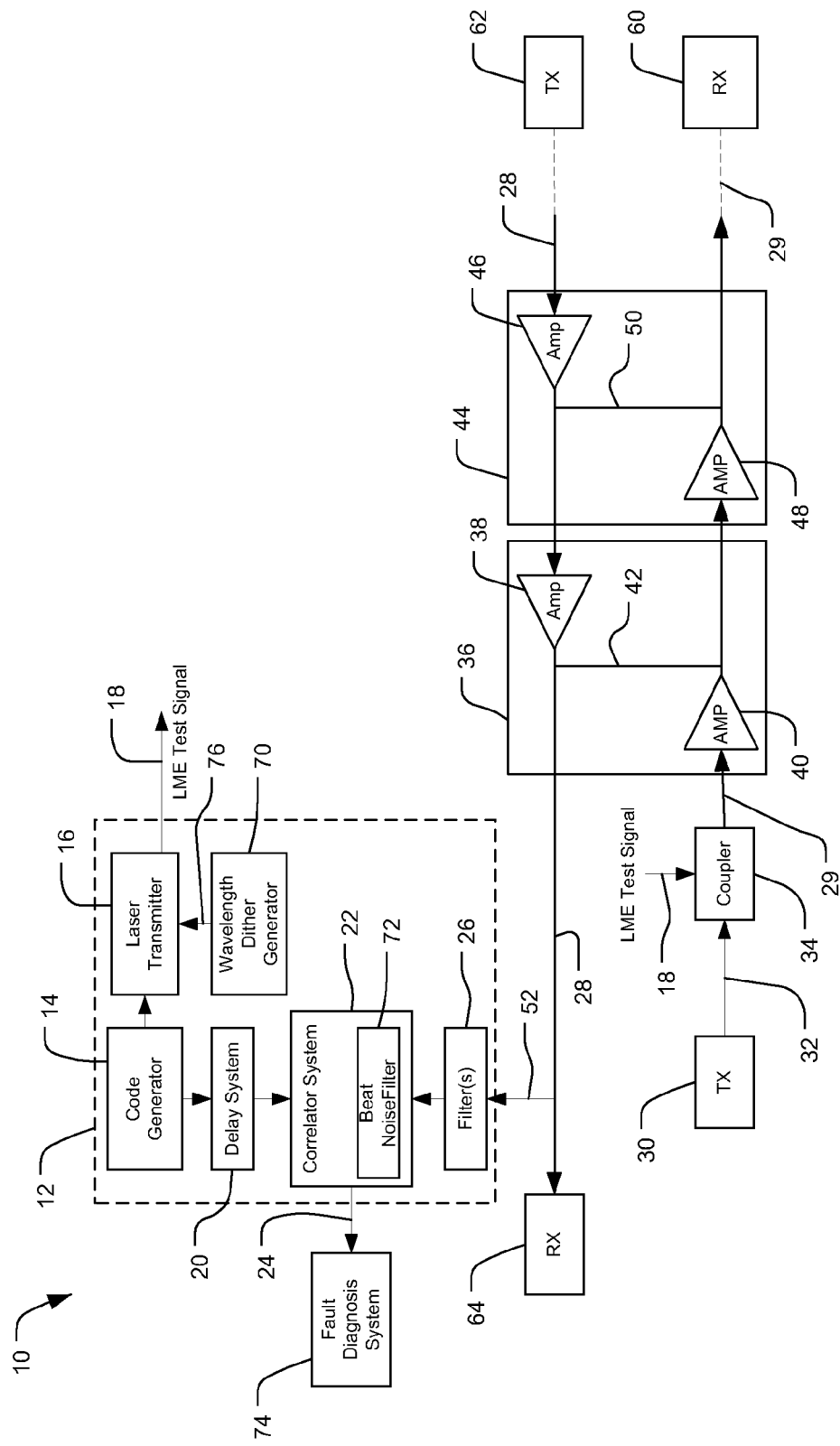
FIG. 1 is a simplified block diagram of one exemplary embodiment of a system consistent with the present disclosure.

FIG. 1 is a simplified block diagram of one exemplary embodiment of a WDM transmission system 10 including line monitoring equipment (LME) 12 consistent with the present disclosure. Those of ordinary skill in the art will recognize that the system 10 has been depicted as a highly simplified point-to-point system form for ease of explanation. It is to be understood that a system and method consistent with the present disclosure may be incorporated into a wide variety of network components and configurations. The illustrated exemplary embodiments herein are provided only by way of explanation, not of limitation.

In the illustrated exemplary embodiment, the transmission system 10 includes a laser transmitter 30 and an optical fiber pair, including fibers 28 and 29, for carrying optical signals. Fibers 28 and 29 may be long distance optical fiber lines for deployment, for example, under the ocean. Optical fibers 28 and 29 may be unidirectional fibers and carry signals in opposite directions. Fibers 28 and 29 together establish a bidirectional path for transmitting signals. While the illustrated exemplary monitoring system is described as monitoring a transmission system including two unidirectional fibers 28 and 29, a system consistent with the present disclosure may be used to monitor transmission systems employing a single bidirectional fiber.

Laser transmitter 30 may be a wavelength-division multiplexing (WDM) transmitter configured to transmit optical data on a plurality of channels (or wavelengths) over fiber 29 to a WDM receiver 60. The transmitter and receiver, of course, are shown in highly simplified form for ease of explanation. Laser transmitter 30 may include a plurality of laser transmitters each transmitting an optical data signal using a different channel or wavelength, and a multiplexer for combining the data signals as an aggregate signal transmitted over fiber 29. The receiver may demultiplex and detect the transmitted data signals. Similarly, WDM data signals may be transmitted over fiber 28 from a transmitter 62 to a receiver 64, i.e. in a direction opposite of those signals on fiber 29. Alternatively, only a single channel of data may be carried on fibers 28 and/or 29.

The line monitoring equipment (LME) 12 is configured for monitoring the health of the system 10. In the illustrated exemplary embodiment, the LME 12 includes a code generator 14, a laser transmitter 16, a wavelength dither generator 70, a delay system 20, a correlator system 22 including a beat noise filter 72, and a filter 26.

The code generator 14 may be configured for generating and outputting a pseudo-random sequence (PRS) of code. A variety of code generator and code configurations are known to those of ordinary skill in the art. The output of the code generator 14 may be coupled to the laser transmitter 16. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The laser transmitter 16 may take a known configuration, e.g. a distributed feedback laser (DFB), and may be configured to produce an optical output at a carrier wavelength $\lambda_0$ that is different from the wavelengths of all of the data channels to be transmitted on the transmission system. The carrier wavelength $\lambda_0$ may, for example, by at an edge of the spectral bandwidth of the system or may be between data channels. The power of the laser output may be set below the power level of the data signals communicated over fibers 28 and 29 to minimize the impairment of the data signals.

Laser transmitter 16 may generate an LME test signal 18 representative of the code received from code generator 14. In one embodiment, the output of the code generator may directly modulate the amplitude of the laser output to provide an LME test signal 18 representative of the PRS code. Other configurations for imparting the PRS code to the output light from the laser transmitter are known. For example, the PRS code may be imparted by an amplitude or other modulator coupled to an output of the laser transmitter 16.

In the illustrated exemplary embodiment, the wavelength dither generator 70 is coupled to the laser transmitter 16 for directly dithering the carrier wavelength $\lambda_0$ of the laser transmitter 16. For example, the wavelength dither generator 70 may provide a wavelength dither signal 76, e.g. a sinusoidal signal, at an SBS input to the laser transmitter 16 for thereby modulating the laser carrier wavelength. Applicants have found that modulating the laser transmitter carrier wavelength consistent with the present disclosure reduces beat noise in the LME 12. In one embodiment, the carrier wavelength $\lambda_o$ may be continuously varied for the duration of each PRS code, i.e. the code length, so that the PRS codes are modulated on a carrier wavelength that differs along the code length, as will be described in greater detail below.

The delay system 20 may be coupled to code generator 14 for delaying the codes received from code generator 14. The filter 26 may be configured selectively transmitting one or more wavelengths or channels corresponding to the LME test signal, while blocking the transmission of other wavelengths.

Correlator 22 may be coupled to delay system 20 and optical filter 26. Correlator 22 may correlate the outputs of optical filter 26 and delay system 20 using well-known digital signal processing techniques. Correlator 22 may output a result 24 of the correlation operation which may be used by a fault diagnosis system 74 to diagnose faults or problems in the optical transmission system 10.

In the illustrated exemplary embodiment, a coupler 34 may combine the WDM data 32 from transmitter 30 and LME test signal 18 from transmitter 16 and output this combined signal for transmission onto fiber 29. A first optical repeater 36 may receive the combined signal from coupler 34. Repeater 36 may include amplifiers 38 and 40 for amplifying optical signals transmitted over fibers 28 and 29, respectively. Repeater 36 may also include a loopback coupler 42, e.g. a high loss loopback path, which returns a portion of the signal being transmitted on fiber 29 to fiber 28 for transmission to LME 12. Similarly, a second optical repeater 44 may include amplifiers 46 and 48 and a loopback coupler 50. Additional optical repeaters, including associated loopback couplers, may be coupled to fibers 28 and 29 for periodically amplifying and returning signals thereon.

Signal 52 may be coupled to the filter 26, and may carry all signals present on fiber 28, including the combined WDM data 32 and LME test signals 18 returned by loopback couplers 42 and 50 over fiber 28. Filter 26 may be wavelength selective and pass only the wavelengths of the LME test signal 18.

Correlator 22 may then correlate the returned LME test signal with the delayed PRS codes from the delay system 20. Correlator 22 may correlate electrical signals or optical signals. Where correlator 22 correlates electrical signals, LME 12 further includes an optical-to-electrical converter connected between filter 26 and the correlator 22 for converting the optical signals output by filter 26 into electrical signals.

Figure 2:
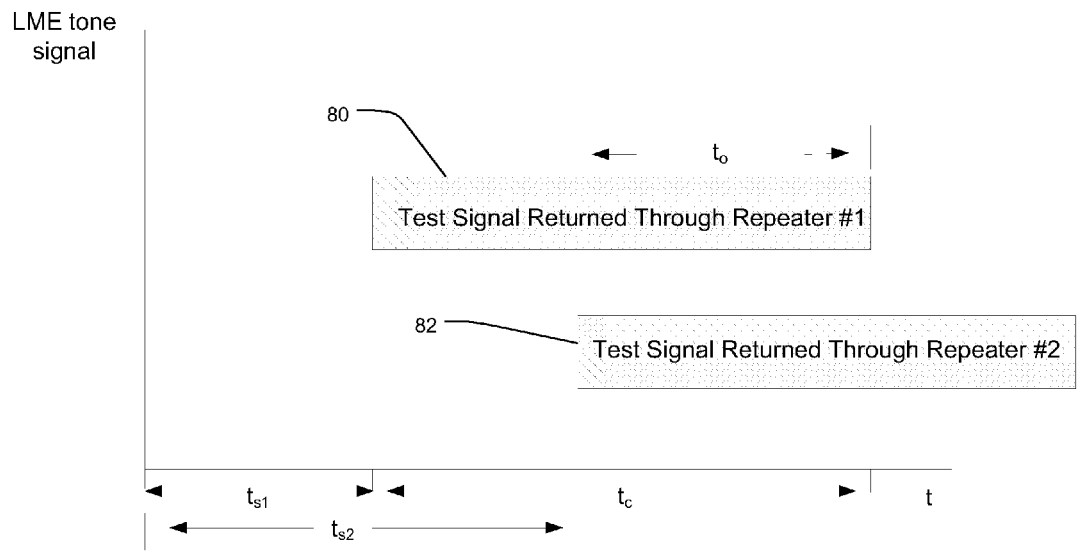
FIG. 2 diagrammatically illustrates a time relationship between successive returned test signals in a system consistent with the present disclosure.

The LME test signals returned to LME 12 by each repeater via fiber 28 are delayed from the original LME test signal 18 by a time period proportional to the distance of the delay path for each repeater. FIG. 2 diagrammatically illustrates time delays for LME test signals 80, 82 having a code length $t_c$ and returned through the first 36 and second repeaters 44, respectively. For the first repeater 36, for example, the time delay $t_{s1}$ is proportional to the distance of the delay path through the first repeater 36. The distance $d_1$ through the first repeater may be calculated as the distance from the code generator 14, to transmitter 16, to coupler 34, to first repeater 36, through loopback coupler 42, to the optical filter 26, and to correlator 22. The time delay $t_{s1}$ for the LME test signal returned by the first repeater 36 may therefore be calculated as $t_{s1}=d_1/c$, where c is the speed of light. Similarly, the time delay $t_{s2}$ for the LME test signal returned by the second repeater 44 can be calculated based on the known distance, $d_2$, of the delay path for the second repeater 44, and may be calculated as $t_{s2}=d_2/c$. Likewise, time delays for additional repeaters (not shown) in the system can also be calculated based on the known distances of their delay paths.

To facilitate the correlation operation, delay system 20 may receive the PRS codes from code generator 14 and output a plurality of delayed PRS codes to correlator 22. Delay system 20 may output each PRS code after the time delays corresponding to each repeater: $t_{s1}$ (corresponding to time delay for the first repeater 36), $t_{s2}$ (corresponding to the time delay for the second repeater 44), etc. In other words, delay system 20 may delay the PRS codes based on the location of each repeater. This process is repeated for each PRS code received by the delay system 20.

In a system wherein the code length $t_c$ of the LME test signals, as illustrated for example in FIG. 2, is longer than the delay time between successive repeaters, successive LME test signals overlap for a time $t_o$ and the overlapping portions of the successive test signals are simultaneously received and detected by the correlator. Those of ordinary skill in the art will appreciate that detection of signals that overlap in time, can result in incoherent beat noise. Consistent with the present disclosure, the beat noise at a detector in the correlator resulting from overlapping of successive LME test signals is suppressed by the wavelength dither imparted to the laser transmitter carrier wavelength $\lambda_o$.

Figure 3:
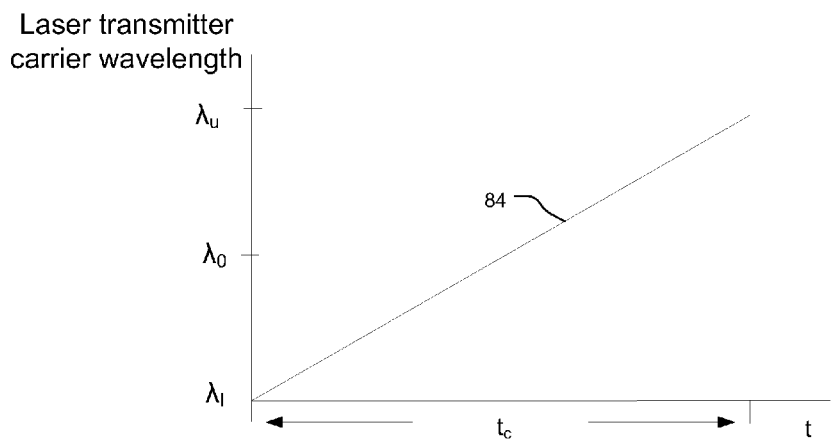
FIG. 3 is a plot of test signal carrier wavelength vs. time in a system consistent with the present disclosure.

In one embodiment, as illustrated in plot 84 in FIG. 3, the wavelength dither signal 76 may cause the carrier wavelength of the laser transmitter 16 to vary continuously from a first wavelength to a second wavelength in the code length. As shown, at the beginning of the code, the carrier wavelength may be $\lambda_1$, at the center of the code length the carrier wavelength may be $\lambda_0$, and at the end of the code length the carrier wavelength may be $\lambda_u$. The variation in the carrier wavelength may be linear, sinusoidal, etc. In one embodiment, the wavelength dither signal 76 may be a 50 Hz sinusoidal signal of 1 Vpp provided at an SBS input to the laser transmitter 16 for thereby modulating the laser carrier frequency about $\lambda_0$ by about 250 MHz.

Since overlapping LME test signals, e.g. test signals 80, 82 in FIG. 2, overlap in different portions of their code length $t_c$, the overlapping portions occupy different wavelengths due to the carrier wavelength dither imparted by the wavelength dither generator 70. In one embodiment, when the frequency difference between the overlapping portions of successive LME test signals is larger than the bandwidth of an electrical beat noise filter 72 provided in the correlator system, incoherent beating noise resulting from the overlapping LME test signals may be filtered out by the electrical filter 72. In one embodiment, the laser carrier frequency may be modulated about $\lambda_o$ by about 250 MHz, and the beat noise filter 72 may have a bandwidth of about 500 KHz.

Figure 4:
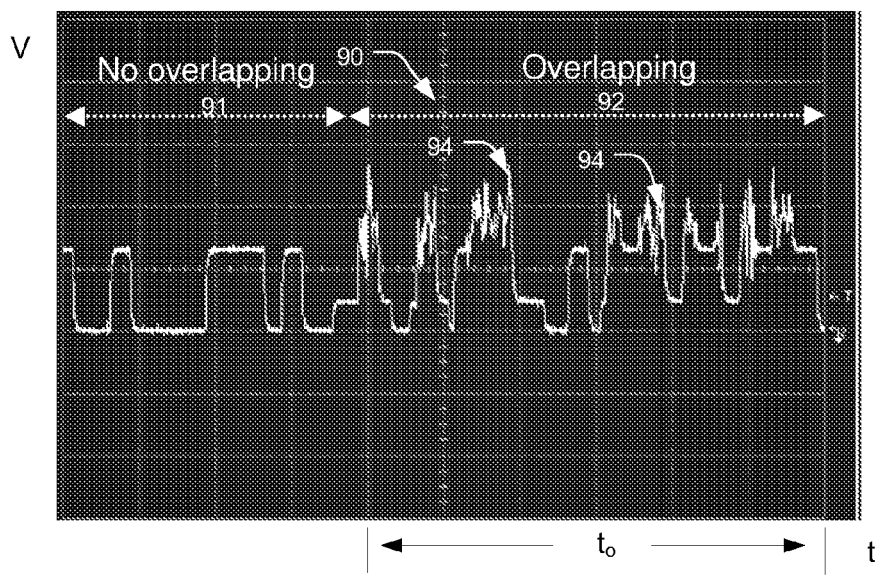
FIG. 4 is a plot of voltage vs. time for a detected test signal in one embodiment of a system not including test signal carrier wavelength dithering.
Figure 5:
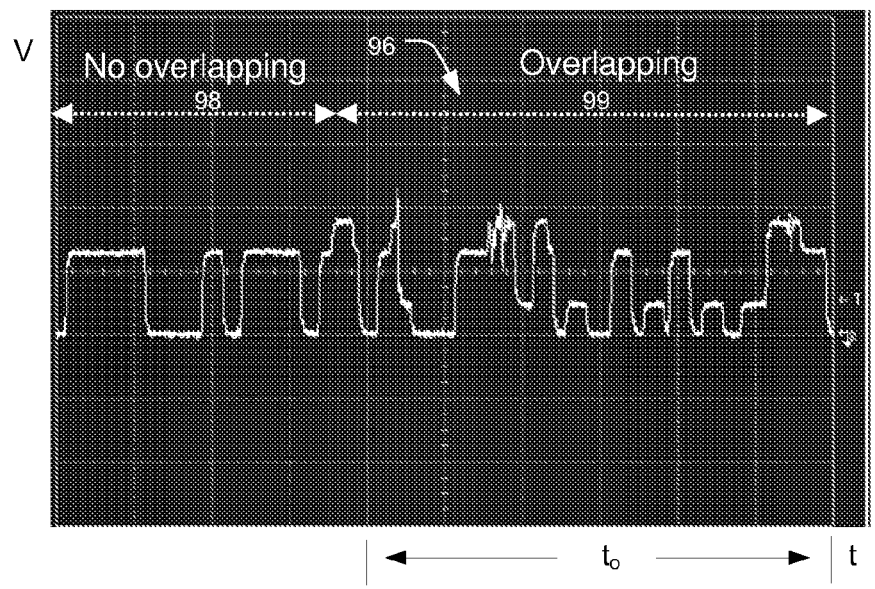
FIG. 5 is a plot of voltage vs. time for a detected test signal in a system including carrier wavelength dithering consistent with the present disclosure.

FIG. 4 includes a plot 90 of voltage vs. time for a detected LME test signal in one embodiment of a system that does not include LME test signal carrier wavelength dithering. A first portion 91 of plot 90 represents a portion of the detected LME signal detected without an overlapping LME test signal, and a second portion 92 of the plot 90 represents a portion of the detected LME test signal detected with an overlapping LME test signal, e.g. for time $t_o$. FIG. 5 includes a plot 96 of voltage vs. time for a detected LME test signal in the system from which plot 90 in FIG. 4 was obtained, but including carrier wavelength dithering consistent with the present disclosure. A first portion 98 of plot 96 represents a portion of the detected LME signal detected without an overlapping LME test signal, and a second portion 99 of the plot 96 represents a portion of the detected LME test signal detected with an overlapping LME test signal, e.g. for time $t_o$. As shown, a beat noise component 94 present in portion 92 of plot 90 (without carrier wavelength dithering) is significantly suppressed in portion 99 of plot 96 consistent with the present disclosure.

There is thus provided a system and method for suppressing beat noise in a line monitoring system. According to one aspect, there is provided a line monitoring system for an optical communication system including: a laser transmitter configured for providing an optical output at a carrier wavelength; a code generator configured to generate a test code and coupled to the laser transmitter for modulating the test code on the optical output to provide a test signal representative of the test code. The test signal may be provided for transmission on an optical path whereby the test signal is returned to the line monitoring system through a first loopback path as a first returned test signal and the test signal is returned to the line monitoring system through a second loopback path as a second returned test signal. A wavelength dither generator is coupled to the laser transmitter and configured for generating a wavelength dither signal for dithering the carrier wavelength, and a correlator is provided for simultaneously receiving overlapping portions of the first and second returned test signals.

According to another aspect of the disclosure there is provided an optical communication system including: a laser transmitter configured for providing an optical output at a carrier wavelength; a code generator coupled to the laser transmitter for modulating a test code on the optical output to provide a test signal representative of the test code; a wavelength dither generator coupled to the laser transmitter and configured for generating a wavelength dither signal for dithering the carrier wavelength; a first optical fiber path for receiving the test signal and carrying the test signal in a first direction; a second optical fiber path for carrying signals in a second direction opposite from the first direction; a first repeater coupled to the first optical fiber path and having an first optical loopback coupled to a second optical fiber path for carrying the test signal in the second direction as a first returned test signal; a second repeater coupled to the first optical fiber path and having an second optical loopback coupled to a second optical fiber path for carrying the test signal in the second direction a second returned test signal; and a correlator for simultaneously receiving overlapping portions of the first and second returned test signals.

According to yet another aspect of the disclosure there is provided a method of suppressing beat noise in optical communication system line monitoring equipment, the method comprising: modulating a test code on an optical signal; dithering a carrier wavelength of the optical signal; transmitting the optical signal as a test signal on the optical communication system after the modulating and dithering; receiving the test signal as a first returned test signal from the optical communication system through a first optical loopback; receiving the test signal as a second returned test signal from the optical communication system through a second optical loopback; and simultaneously detecting overlapping portions of the first and second returned test signals.

The embodiments that have been described herein but some of the several which utilize this invention and are set forth here by way of illustration but not of limitation. Many other embodiments, which will be readily apparent to those of ordinary skill in the art, may be made without departing materially from the spirit and scope of the invention

What is claimed is:

1. A line monitoring system for an optical communication system comprising:
    a laser transmitter, said laser transmitter configured for providing an optical output at a carrier wavelength;
    a code generator configured to generate a test code, said code generator being coupled to said laser transmitter for modulating said test code on said optical output to provide a test signal representative of said test code, said test signal being provided for coupling to an optical path whereby said test signal is returned to the line monitoring system through a first loopback path as a first returned test signal and said test signal is returned to the line monitoring system through a second loopback path as a second returned test signal;
    a wavelength dither generator coupled to said laser transmitter, said wavelength dither generator being configured for generating a wavelength dither signal for dithering said carrier wavelength; and
    a correlator for simultaneously receiving overlapping portions of said first and second returned test signals,
    said wavelength dither generator being configured to vary said carrier wavelength along a code length of said test code so that said overlapping portions of said first and second returned test signals occupy different wavelengths thereby suppressing beat noise in said first and second returned test signals.

2. A line monitoring system according to claim 1, wherein said wavelength dither generator is configured to continuously vary said carrier wavelength along said code length.

3. A line monitoring system according to claim 1, wherein said wavelength dither generator is configured to sinusoidally vary said carrier wavelength along said code length.

4. A line monitoring system according to claim 1, wherein said wavelength dither generator is directly coupled to said laser transmitter for directly dithering said carrier wavelength.

5. A line monitoring system according to claim 1, wherein said code generator is directly coupled to said laser transmitter for directly modulating said test code on said optical output.

6. A line monitoring system according to claim 1, wherein said test code comprises a pseudo-random sequence code.

7. A line monitoring system according to claim 1, said system further comprising a beat noise filter for filtering noise from said first returned test signal and said second returned test signal, said beat noise filter having a bandwidth less than a difference between the wavelengths of said first and second returned test signals in said overlapping portions.

8. An optical communication system comprising:
    a laser transmitter, said laser transmitter configured for providing an optical output at a carrier wavelength;
    a code generator coupled to said laser transmitter for modulating a test code on said optical output to provide a test signal representative of said test code;
    a wavelength dither generator coupled to said laser transmitter, said wavelength dither generator being configured for generating a wavelength dither signal for dithering said carrier wavelength;
    a first optical fiber path for receiving said test signal and carrying said test signal in a first direction;
    a second optical fiber path for carrying signals in a second direction opposite from said first direction;
    a first repeater coupled to said first optical fiber path and having an first optical loopback coupled to a second optical fiber path for carrying said test signal in said second direction as a first returned test signal;
    a second repeater coupled to said first optical fiber path and having an second optical loopback coupled to a second optical fiber path for carrying said test signal in said second direction a second returned test signal; and
    a correlator for simultaneously receiving overlapping portions of said first and second returned test signals,
    said wavelength dither generator being configured to vary said carrier wavelength along a code length of said test code so that said overlapping portions of said first and second returned test signals occupy different wavelengths thereby suppressing beat noise in said first and second returned test signals.

9. An optical communication system according to claim 8, wherein said wavelength dither generator is configured to continuously vary said carrier wavelength along said code length.

10. An optical communication system according to claim 8, wherein said wavelength dither generator is configured to sinusoidally vary said carrier wavelength along said code length.

11. An optical communication system according to claim 8, wherein said wavelength dither generator is directly coupled to said laser transmitter for directly dithering said carrier wavelength.

12. An optical communication system according to claim 8, wherein said code generator is directly coupled to said laser transmitter for directly modulating said test code on said optical output.

13. An optical communication system according to claim 8, wherein said test code comprises a pseudo-random sequence code.

14. An optical communication system according to claim 8, said system further comprising a beat noise filter for filtering noise from said first returned test signal and said second returned test signal, said beat noise filter having a bandwidth less than a difference between the wavelengths of said first and second returned test signals in said overlapping portions.

15. A method of suppressing beat noise in optical communication system line monitoring equipment, said method comprising:
 modulating a test code on an optical signal;
 dithering a carrier wavelength of said optical signal;
 transmitting said optical signal as a test signal on said optical communication system after said modulating and said dithering, said dithering comprising varying said carrier wavelength along a code length of said test code;
 receiving said test signal as a first returned test signal from said optical communication system through a first optical loopback;
 receiving said test signal as a second returned test signal from said optical communication system through a second optical loopback; and
 simultaneously detecting overlapping portions of said first and second returned test signals, wherein beat noise in said first and second test signals is suppressed by said dithering.

16. A method according to claim 15, wherein said dithering comprises continuously varying said carrier wavelength along said code length.

17. A method according to claim 15, wherein said dithering comprises sinusoidally varying said carrier wavelength along said code length.

18. A method according to claim 15, wherein said first optical loopback is disposed in a first repeater and said second optical loopback is disposed in a second repeater.

19. A method according to claim 15, wherein said test code comprises a pseudo-random sequence code.

20. A method according to claim 15, said method further comprising filtering noise from said first returned test signal and said second returned test signal using a beat noise filter having a bandwidth less than a difference between the wavelengths of said first and second returned test signals in said overlapping portions.

* * * * *